(12) United States Patent
Fischer et al.

(10) Patent No.: US 11,001,018 B2
(45) Date of Patent: May 11, 2021

(54) SURFACE-MODIFIABLE INJECTION-MOLDED BODY AND METHOD FOR ITS PRODUCTION

(71) Applicant: Lisa Draexlmaier GmbH, Vilsbiburg (DE)

(72) Inventors: Wolfgang Fischer, Dorfen (DE); Bernhard Huber, Eggenfelden (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 253 days.

(21) Appl. No.: 15/509,468

(22) PCT Filed: Jul. 15, 2015

(86) PCT No.: PCT/EP2015/066185
§ 371 (c)(1),
(2) Date: Mar. 7, 2017

(87) PCT Pub. No.: WO2016/037743
PCT Pub. Date: Mar. 17, 2016

(65) Prior Publication Data
US 2017/0305081 A1    Oct. 26, 2017

(30) Foreign Application Priority Data

Sep. 8, 2014    (DE) .................... 10 2014 112 876.1

(51) Int. Cl.
*B29C 45/16*    (2006.01)
*B29C 45/72*    (2006.01)
(Continued)

(52) U.S. Cl.
CPC .......... *B29C 71/02* (2013.01); *B29C 45/0001* (2013.01); *B29C 45/0053* (2013.01);
(Continued)

(58) Field of Classification Search
CPC ............ B29C 66/0242; B29C 45/0053; B29C 45/7207; B29C 65/103; B29C 45/0001;
(Continued)

(56) References Cited

U.S. PATENT DOCUMENTS

2004/0228971 A1    11/2004 Scaramuzzino
2005/0163998 A1    7/2005 Kashikar et al.
(Continued)

FOREIGN PATENT DOCUMENTS

DE    103 49 177 A1    5/2004
EP    2 374 593 A1    10/2011
(Continued)

OTHER PUBLICATIONS

Office Action in German Application No. DE 10 2014 112 876.1, dated Dec. 22, 2014.
(Continued)

*Primary Examiner* — Michael A Tolin
(74) *Attorney, Agent, or Firm* — Finnegan, Henderson, Farabow, Garrett & Dunner, LLP

(57) ABSTRACT

The present disclosure relates to a surface-modifiable injection-molded body comprising a thermoplastic polymer matrix and second polymer material at least in parts, in which the polymer matrix and the second polymer material have different weight average molecular weights and polarities, and the second polymer material is an adhesive. The present disclosure also relates to a method for its production.

9 Claims, 1 Drawing Sheet

(51) Int. Cl.
　　　*B29C 65/02*　　(2006.01)
　　　*B29C 65/14*　　(2006.01)
　　　*B29C 65/48*　　(2006.01)
　　　*B29C 65/52*　　(2006.01)
　　　*B29C 71/02*　　(2006.01)
　　　*B29K 105/00*　　(2006.01)
　　　*B29K 21/00*　　(2006.01)
　　　*B29K 96/04*　　(2006.01)
　　　*B29L 31/30*　　(2006.01)
　　　*B29C 45/00*　　(2006.01)
　　　*B29C 65/00*　　(2006.01)

(52) U.S. Cl.
　　　CPC ...... *B29C 45/1657* (2013.01); *B29C 45/7207* (2013.01); *B29C 65/02* (2013.01); *B29C 65/1425* (2013.01); *B29C 65/4815* (2013.01); *B29C 65/52* (2013.01); *B29C 66/026* (2013.01); *B29C 66/0242* (2013.01); *B29C 66/1122* (2013.01); *B29C 66/71* (2013.01); *B29C 66/721* (2013.01); *B29C 66/7392* (2013.01); *B29C 66/73921* (2013.01); *B29K 2021/003* (2013.01); *B29K 2096/04* (2013.01); *B29K 2105/0085* (2013.01); *B29L 2031/3005* (2013.01)

(58) Field of Classification Search
　　　CPC ... B29C 45/16; B29C 45/164; B29C 45/1657; B29C 45/72; B29C 2045/1664; B29C 65/02; B29C 65/1425; B29C 65/4815; B29C 65/52; B29C 66/026; B29C 66/028; B29C 66/1122; B29C 66/71; B29C 66/721; B29C 66/7392; B29C 66/73921; B29C 71/02; B29K 2021/003; B29K 2023/06; B29K 2023/12; B29K 2025/06; B29K 2025/08; B29K 2055/02; B29K 2069/00; B29K 2077/00; B29K 2096/04; B29K 2105/0085; B29L 2031/3005; B29L 2031/3008; B29L 2031/3014; B29L 2031/302; B29L 2031/3041

See application file for complete search history.

(56)　　　　　References Cited

U.S. PATENT DOCUMENTS

| 2008/0058455 A1* | 3/2008 | Wevers | C08J 3/226 524/451 |
|---|---|---|---|
| 2013/0221569 A1 | 8/2013 | Probst et al. | |
| 2013/0221731 A1* | 8/2013 | Hess | B60B 5/02 301/37.101 |
| 2015/0010765 A1* | 1/2015 | Munro | C08L 53/00 428/516 |
| 2015/0123386 A1* | 5/2015 | Raines | B60R 21/02 280/741 |

FOREIGN PATENT DOCUMENTS

| EP | 2 664 643 A1 | 11/2013 |
| GB | 2 394 695 A | 5/2004 |
| WO | WO 2008/064950 A1 | 6/2008 |

OTHER PUBLICATIONS

International Search Report, International Application No. PCT/EP2015/066185, dated Sep. 10, 2015.

* cited by examiner

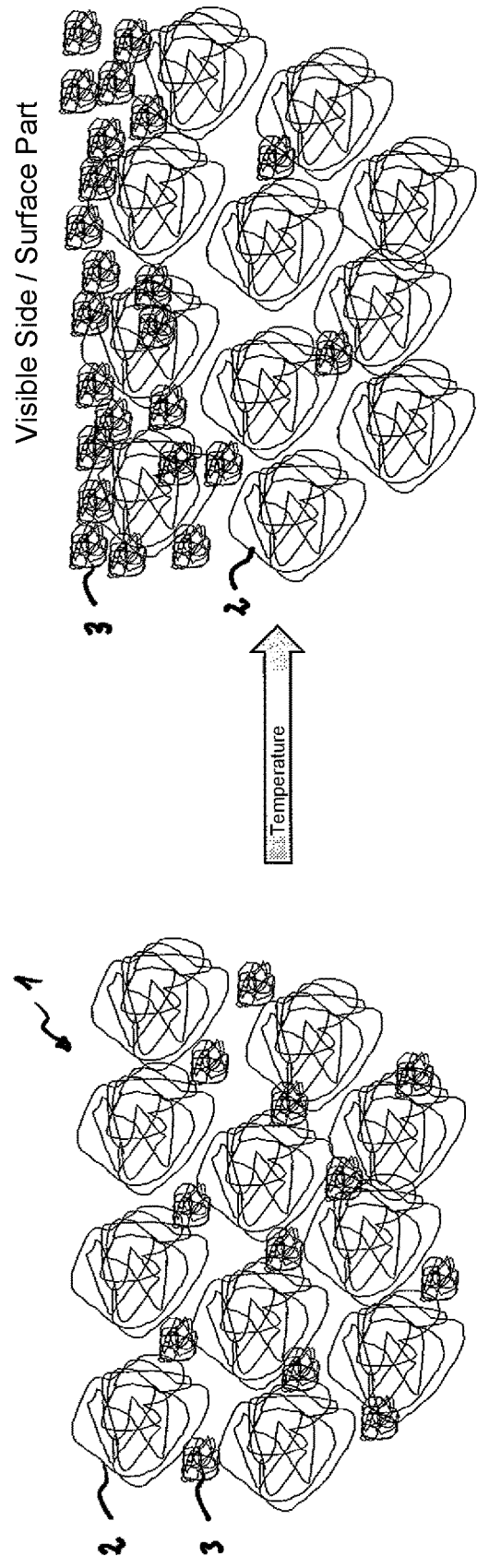
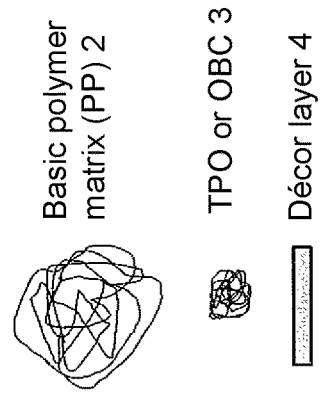
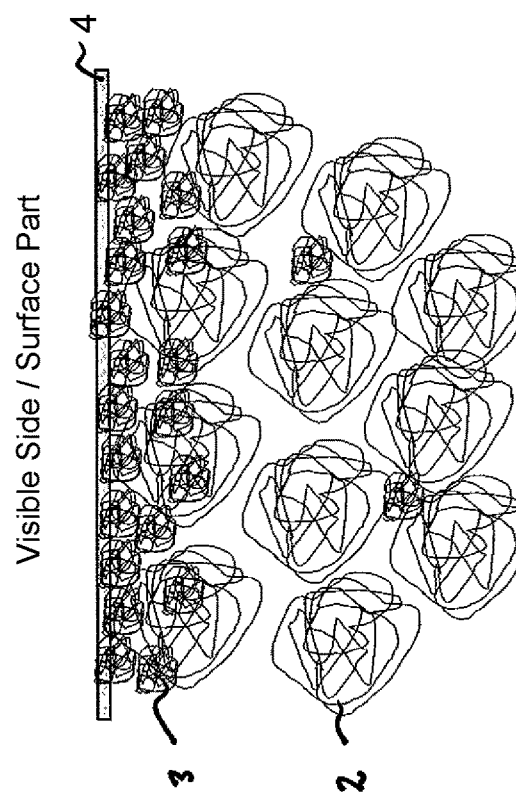
FIG. 1
FIG. 2
FIG. 3

US 11,001,018 B2

SURFACE-MODIFIABLE INJECTION-MOLDED BODY AND METHOD FOR ITS PRODUCTION

CROSS-REFERENCE TO RELATED APPLICATION

This application is a national phase of International Application No. PCT/EP2015/066185, filed on Jul. 15, 2015, which claims priority to German Patent Application No. 10 2014 112 876.1, filed on Sep. 8, 2014. The contents of the above-referenced applications are expressly incorporated herein by reference to their entireties.

TECHNICAL FIELD

The present disclosure relates to a surface-modifiable injection-molded body comprising a thermoplastic polymer matrix and, at least in parts, a second polymer material, and to a corresponding method for its production and use.

Synthetic materials in automotive engineering now make up between 15 and 20 percent by weight, a share that continues to grow. The parts involved here are often exterior and interior components that have particular optical, haptic and functional properties imparted to them by adhering various surface decors on injection-molded components. Growing demands on quality and economy as well as efficient use of resources, but also global competitive pressure require increasingly economical, sustainable and flexible coating processes.

Plastic parts in the form of injection-molded bodies are used in particular in automobile interiors for applications such as instrument panels, door paneling or center consoles. The plastic parts are often provided with surface decors of leather or a foil to give them a more elegant appearance. These decors are fixed in place and joined together on the molded bodies using dispersion or hotmelt adhesives.

To fix the decors in place, a step for pretreating the surface of the molded body is usually required to ensure that a suitable surface tension is achieved within a defined processing window. In general, the adhesive properties are optimized by activating the surface with flame or plasma treatment or gas-phase fluorination.

However, one disadvantage of this method is that it requires at least one additional step in the production process, and additional equipment that is often complex and expensive. Moreover, treating the surfaces with acids and solvents has a heavy environmental impact.

BACKGROUND OF THE INVENTION

This has given rise to a growing trend toward reducing the number of gluing steps in attachments made of plastic, for instance, by integrating a gluing function into the injection-molding process.

Polypropylene and reinforced polypropylene are cost-effective and frequently used plastics for injection-molded parts. In most cases, due to the apolar properties of the polypropylene, it is not possible to further process or finish the injection-molded parts without pretreatment. Pretreatment is necessary especially in the case of gluing and varnishing, as otherwise the adhesives and varnishes would not adequately bond to the surface.

In what is referred to as "cure on demand," the glue or an adhesive layer is applied to the injection-molded part in a process step directly following the injection molding.

For example, German Patent Document DE 103 49 177 A1 discloses a process for finishing previously molded panels that includes the following steps:
(a) a layer of a solid adhesive type Hot Melt 100% based on reactive polyurethane is applied with a squeegee or a roller to one of the two surfaces of a laminate, a foil or a film for coating purposes, particularly one made of a polymer material or a natural material or technical fabric;
(b) the laminate, foil or film intended for the coating is placed on the corresponding surface of the panel to be finished;
(c) the laminate, foil or film intended for the coating is preheated; and
(d) the panel to be finished is covered with the laminate, foil or film intended for the coating by hot pressing.

Comparable methods may be found in the field of metal-plastic composites.

European Patent Document EP 2 374 593 A1 discloses an injection-molding method for modifying a surface of a molded body of apolar polymer, a multilayer foil suitable for this purpose and a molded polymer part with a modified surface. The method involves back-molding a multilayer foil having at least a first apolar layer and a second layer with one or more surface properties that differ from those of the first layer. Back-molding foils is a technology that is known per se, in which first of all a foil is placed in the cavity of an injection-molding tool or it is spread out on the injection mold. The foil is pressed into the cavity, then shaped to match the form of the cavity. A polymer is then injected into the cavity, whereupon the side of the foil facing the polymer bonds with the polymer. This results in molded parts coated with a foil. Nowadays, back-molding is applied in particular in decor foils, as in the technique referred to as "in-mold-decoration" (IMD).

Moreover, EP 2 374 593 A1 discloses that a multilayer foil with one or more apolar layers and one or more second layers having at least one surface property that differs from that of the first layer is laid into the cavity of the injection-molding tool in such a way that the first apolar layer faces the interior of the cavity while the second layer comes to rest on the inner wall of the cavity. The apolar polymer is then injected into the interior of the mold. The injected polymer and the first apolar layer of the multilayer foil are in contact with one another in the mold and subsequently bind together.

European Patent Document EP 2 664 643 A1 shows a molded material in which a composite material has reinforcing fibers that contain a thermoplastic binding agent.

United States Patent Application No. 2005/163998 A1 discloses a compound for coating reinforcing fibers that have only one polymeric component.

International Application WO 2008/064950 A1 shows a molded part to be adhered to metal or plastic substrates, which consists entirely of a hotmelt adhesive.

Here the second layer of the multilayer foil has at least one surface property that differs from the first apolar layer.

DESCRIPTION OF THE INVENTION

Therefore, it is the object of the present disclosure to provide an injection-molded body or molded plastic body having adhesive and wetting properties that are modifiable in that the number of process steps for adhesion of the molded body and the costs for the necessary tools are reduced while quality requirements for the adhesion are met.

Another object of the present disclosure is to provide a corresponding method in which during or after the injection molding, the adhesive and wetting properties of a molded part's surface are functionally improved with no additional effort or expense.

This object is fulfilled in accordance with the present disclosure by an injection-molded body with the features of Claim 1 and by a method in accordance with Claim 9.

The fundamental idea behind the present invention resides in the fact that the surface-modifiable injection-molded body encompasses a thermoplastic polymer matrix and a second polymer material at least in parts. The polymer matrix and the second polymer material have different weight-average molecular weights and polarities and the second polymer material is suitable as an adhesive.

In other words, the second polymer material is already incorporated as a bondable component into a thermoplastic polymer matrix in the injection-molded body. In the finished, cooled state, the bondable component forms a separate layer such as a surface layer at least in parts. The desired molded body area is heated for further processing or adhesion. An active surface of this nature thus behaves as if an adhesive has been applied. This is evidenced by a sticky surface and an increase in surface tension, since the polar component migrates to the surface.

In view of the prior art it was surprising and unforeseeable for the person skilled in the art that the object on which the present disclosure was based could be achieved with the aid of the injection-molded body of the present disclosure and the method for its production. A particular advantage of the injection-molded body and the proposed method of the present disclosure lies namely in the complete elimination of the step of separately activating the substrate and externally applying an adhesive.

The surface-modifiable injection-molded body is subjected to heat. When subjected to heat, the thermoplastic polymer matrix and the second polymer material at least partly enter into a phase separation, with a concentration of the second polymer material accumulating on the surface of the injection-molded body. Before and during the injection-molding process, the thermoplastic polymer matrix and the tackifying second polymer component are initially present as a largely homogenous mixture in the injection-molding material. The surface-modifiable injection-molded body is altered under thermal influence, for example by heat or radiation, and subsequent cooling. Due to the low average molecular masses and densities of the second polymer component, as well as the increased polarity of the second polymer component relative to the matrix material, the second polymer component moves relatively freely within the polymer matrix upon being heated. On cooling there is a thermodynamically controlled phase separation which can be used as an adhesive function.

A separate adhesion process may not be required, thus reducing investment costs for the adhesive application and/or activation equipment, and eliminating operating costs associated with the activation units and applying the adhesive.

The thermoplastic polymer matrix is preferably selected from the group consisting of acrylonitrile-butadiene styrene (ABS), styrene acrylonitrile (SAN), polystyrene (PS), polycarbonate (PC), polyethylene (PE), polypropylene (PP), polyamide (PA) or mixtures thereof. These may be fiber-reinforced.

The second polymer material is preferably a functionalized thermoplastic polyolefin elastomer (POE), an olefin block copolymer (OBC) or a mixture thereof.

The second polymer material here is preferably capable of being melted and re-solidified.

The second polymer material is also preferably contained in the surface-modifiable injection-molded body in a proportion of 5-40% by mass, preferably 10-30% by mass, and particularly 10-25% by mass.

The second polymer material preferably has an average molecular weight of 11,000 to 37,000 g/mol.

The surface-modified injection-molded body comprising the first and/or second polymer may have additives capable of being coupled by microwave treatment.

The microwave-treatable additives preferably contain carbon fibers, carbon nanotubes, graphene or the like. This makes it possible for the molded body to be heated where applicable by microwave treatment alone.

The method of the present disclosure for the production of a surface-modified molded body includes the following steps:

providing a thermoplastic polymer matrix with a second polymer material, wherein the polymer matrix and the second polymer material have different weight average molecular weights and polarities and the second polymer material is suitable as an adhesive;

melting, injection molding and cooling the material in an injection-molding tool, wherein upon melting, the thermoplastic polymer matrix and the second polymer material at least partly enter into a phase separation with concentration of the second polymer material on the surface of the injection-molded body;

removing the molded body from the injection-molding tool; and heating or melting and re-solidifying the injection-molded body, wherein the second polymer material acts as an adhesive for bonding the injection-molded body to another component.

The injection-molded body is preferably heated or melted and cooled under gradient control, resulting in a selective, controlled concentration of the second polymer material on a predetermined surface or surface area of the injection-molded body. In some embodiments, only a selected surface area of the molded body is heated and adhered to another component.

The injection-molded body is preferably heated, melted and/or cooled under gradient control in such a manner that a selective concentration of the second polymer material occurs on a visible surface of the injection-molded body. This visible area is then bonded or adhered to a flat decor part. Thus, a molded body is advantageously provided by heating and subsequently adhering the heated surface-modifiable injection-molded body to a suitable decor part, such that the step of applying an adhesive may be eliminated. The adhesive is already an intrinsic part of the molded body and can be selectively released by simple heating.

EXAMPLES

The examples below are intended to explain the invention without restricting it.

The examples in tabular form show various functionalized polyolefin elastomers (POE), olefin block copolymers (OBC) or mixtures thereof as the second polymer material according to the present disclosure.

Some examples of products recently put on the market that represent the starting point in hotmelt adhesive technology for use in injection-molded parts include "Infuser™" (Dow Chemical Company) olefin block copolymers (OBC) and "Affinity™" GA (Dow Chemical Company) polyolefin elastomers (POE, TPO).

In comparison to conventional polyolefins, both polymers generally have extraordinarily low average molecular masses and densities and high polarities. Additional special physicochemical properties have been discussed elsewhere.

The Infuse™ (Dow Chemical Company) olefin block copolymers (OBC) are ethylene and α-olefin copolymers consisting of alternating semi-crystalline and elastomer blocks or segments that are statistically distributed in a multi-block architecture and contribute decisively to their hotmelt-adhesive functionality.

The following tables show examples of the different properties of Affinity™ GA (Dow Chemical Company) polyolefin elastomers (POE, TPO).

TABLE 1

Functionalized Polyolefin Elastomer "Affinity ™ GA 1000R"
AFFINITY ™ GA 1000R
Functionalized Polyolefin Elastomer
Overview Complies with:
EU, No 10/2011
U.S. FDA 21 CFR 175.105
Consult the regulations for comptete details.

|  | Nominal Value (English) | Nominal Value (SI) | Test Method |
|---|---|---|---|
| Physical |  |  |  |
| Gardner Color | <5.00 | <5.00 | ASTM D3417 |
| MAH Graft Level | High | High | Dow Method |
| Volatile Matter | <0.15% | <0.15% | ASTM D3030 [1] |
| Mechanical |  |  |  |
| Tensile Strength | 271 psi | 1.87 MPa | ASTM D638 |
| Tensile Elongation (Break) | 170% | 170% | ASTM D638 |
| Thermal |  |  |  |
| Glass Transition Temperature (DSC) | −72.4° F. | −58.0° C. | Dow Method |
| Melting Temperature (DSC) | 154° F. | 68.0° C. | Dow Method |
| Fill Analysis |  |  |  |
| Brookfield Viscosity (350° F. (177° C.)) | 13.0 Pa·s | 13.0 Pa·s | ASTM D1084 |

Notes
These are typical properties only and are not to be construed as specifications. Users should confirm results by their own tests.
[1] Modified for polyolefins. Change the temperature used to 100° C. +/− 3 and the amount of sample to 20 grams.

TABLE 2

Physical Properties of Adhesive-Suitable "Affinity™ GA" Polyolefin Elastomers

| Polymer | Density (g/cm$^2$) | Melting index, g/10 min (190°, 2.16 kg weight) | Viscosity cP @ 177° C. | $T_m$ (° C.) | $T_c$ (° C.) | % Crystallinity | TG (° C.) |
|---|---|---|---|---|---|---|---|
| AFFINITY ™ GA 1900 POE | 0.870 | 1000 | 8200 | 68 | 54 | 16 | −58 |
| AFFINITY ™ GA 1950 POE | 0.874 | 500 | 17000 | 70 | 53 | 18 | −57 |
| AFFINITY ™ GA 8200 G POE | 0.870 | 5 | — | 63 | 46 | 16 | −53 |

Starting materials of the examples:
a) Polymer matrix of polypropylene (PP);
b) "Infuse 9817": Copolymer of ethylene with octene, melting point 120° C., flexural modulus 23 MPa, density 0.877 g/m3, melting index 15 g/10 min before grafting and 4 g/10 min after grafting; and
c) "Affinity™ GA" polyolefin elastomer.

Example 1

Infuse 9817 is mixed with PP in the melt in an injection-molding machine with a proportion of 10-30% by mass and applied in the form of a flat molded body. This is followed by heating, adhering and subjecting the molded body to a technical adhesive strength test:
a) Two molded bodies bonded together have a tensile strength >7000 N according to DIN; and
b) A molded body with a flat decor part (PVC, PUR, foamed) bonded to it has a tensile strength >10-50 N according to DIN after being heated to approximately 180° C.

The tensile strength measured corresponds in magnitude to the tensile strength achieved by applying a conventional adhesive.

Example 2

In addition, analytical methods for measuring surface tension are also used to characterize the surface and the adhesive distribution:
a) As reference material, a molded body surface of pure PP has a surface tension after heating of 28 mN/m according to DIN; and
b) A molded body surface PP+TPO/OBC according to the present disclosure has a surface tension after heating of 32-34 mN/m according to DIN.

The significant increase in surface tension, which is marked by a noticeable tackiness of the surface, is evidence of the concentration of the polar TPO/OBC polymer component in the surface.

BRIEF DESCRIPTION OF THE DRAWINGS

Individual embodiments of the injection-molded body and/or its production and use are explained in greater detail below with reference to the drawings.

FIG. 1 shows a schematic representation of a surface-modifiable injection-molded body according to the present disclosure, with a thermoplastic polymer matrix and a second polymer material at least in parts;

FIG. 2 shows a schematic representation of the structural change and/or phase separation of a surface-modifiable injection-molded body when subjected to heat; and FIG. 3 shows a schematic representation of the adhesion of a heated surface-modified injection-molded body to a decor part.

FIG. 1 shows the general structure of the injection-molded body 1 during the injection molding includes a thermoplastic polymer matrix 2, shown as large tangled knots. The matrix may consist of acrylonitrile-butadiene styrene (ABS), styrene acrylonitrile (SAN), polystyrene (PS), polycarbonate (PC), polyethylene (PE), polypropylene (PP), polyamide (PA), in each case reinforced with fibers or unreinforced, or mixtures thereof.

Integrated into this matrix are the products "Infuse™" (Dow Chemical Company) olefin block copolymers (OBC) and/or "Affinity™" GA (Dow Chemical Company) polyolefin elastomers (POE), which form the tackifying component of the molded body and are depicted as small tangled knots. These may differ from the matrix material particularly by a lower average molecular weight and a comparatively high polarity.

Before and during the injection-molding process the thermoplastic polymer matrix 2 and the tackifying olefin block copolymers (OBC) and/or polyolefin elastomers (POE) are initially present in the injection-molding granulate as a largely homogenous mixture, and subsequently as a homogenous statistical mixture in the injection-molding material.

FIG. 2 illustrates the structural change in the surface-modifiable injection-molded body 1 when subjected to thermal influence, for example by heat or radiation, and subsequent cooling. Due to the low average molecular masses and densities of the olefin block copolymers (OBC) and the polyolefin elastomers, as well as their increased polarity relative to the matrix material, the olefin block copolymers (OBC) and the polyolefin elastomers move relatively freely within the polymer matrix 2 upon being heated. A thermodynamically controlled phase separation takes place during the cooling. The olefin block copolymers (OBC) and/or the polyolefin elastomers ideally accumulate on the colder tool parts and/or on the surface or surfaces of the injection-molded body 1.

FIG. 3 shows a schematic representation of how the hotmelt adhesive functionality of the olefin block copolymers (OBC) and/or thermoplastic polyolefin elastomers (POE) is utilized. They have now accumulated on the molded body surface, and the surface-modified injection-molded body 1 is heated and then adhered to a suitable decor part 4. The heating may take place by microwave treatment alone, preferably supported by integrated additives capable of being coupled by microwave treatment. In this manner, a separate application of adhesive is not necessary. The decor part 4 is particularly an elastic, flat covering element, for instance of leather or artificial leather.

The invention claimed is:

1. A method for the production of a surface-modified molded body, the method comprising:
providing a mixture comprising a thermoplastic polymer matrix and a second polymer material, the thermoplastic polymer matrix having a first weight average molecular weight and a first polarity and the second polymer material having a second weight average molecular weight that is lower than the first weight average molecular weight and a second polarity that is higher than the first polarity, wherein the second polymer material is configured to function as an adhesive, the thermoplastic polymer matrix and the second polymer material being statistically distributed in the mixture;
injection molding the mixture in an injection-molding tool to form an injection-molded body, wherein the thermoplastic polymer matrix and the second polymer material at least partly enter into a phase separation such that the second polymer material accumulates on a predetermined surface of the injection-molded body;
removing the injection-molded body from the injection-molding tool;
heating and cooling the injection-molded body under gradient control to selectively accumulate the second polymer material on at least part of the predetermined surface of the injection-molded body; and
adhering the predetermined surface of the injection-molded body to a first component, wherein the second polymer material bonds the injection-molded body to the first component;
wherein the method does not comprise separately activating the first component or externally applying a further adhesive to the first component.

2. The method according to claim 1, wherein:
the predetermined surface of the injection-molded body is a visible surface of the injection-molded body, and
the first component is a flat decor part.

3. The method according to claim 1, wherein the thermoplastic polymer matrix is selected from the group consisting of acrylonitrile-butadiene styrene (ABS), styrene acrylonitrile (SAN), polystyrene (PS), polycarbonate (PC), polyethylene (PE), polypropylene (PP), polyamide (PA), and mixtures thereof.

4. The method according to claim 1, wherein the thermoplastic polymer matrix is fiber-reinforced or unreinforced.

5. The method according to claim 1, wherein the second polymer material is a functionalized thermoplastic polyolefin elastomer (POE), an olefin block copolymer (OBC) or a mixture thereof.

6. The method according to claim 1, wherein the second weight average molecular weight of the second polymer material is 11,000 to 37,000 g/mol.

7. The method according to claim 1, wherein:
the heating and cooling of the injection-molded body under gradient control causes a selective concentration of the second polymer material to accumulate on the predetermined surface of the injection-molded body, and
the predetermined surface of the injection-molded body is a visible surface of the injection-molded body.

8. The method according to claim 1, wherein the injection-molded body contains a 10-30% proportion by mass of the second polymer material.

9. The method according to claim 1, wherein the injection-molded body contains a 10-25% proportion by mass of the second polymer material.

* * * * *